Figure 1:
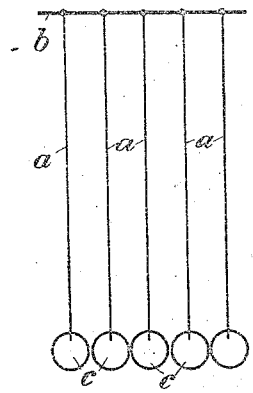

M. HUTH.
WIRE ELECTRODE FOR ELECTROLYTIC PURPOSES.
APPLICATION FILED JULY 7, 1916.

1,209,710.  Patented Dec. 26, 1916.

Inventor:
Max Huth
By [signature]
his Attorney

UNITED STATES PATENT OFFICE

MAX HUTH, OF CHARLOTTENBURG, GERMANY, ASSIGNOR TO SIEMENS & HALSKE AKTIENGESELLSCHAFT, OF BERLIN, GERMANY, A CORPORATION OF GERMANY.

WIRE ELECTRODE FOR ELECTROLYTIC PURPOSES.

1,209,710.  Specification of Letters Patent.  Patented Dec. 26, 1916.

Application filed July 7, 1916. Serial No. 108,081.

*To all whom it may concern:*

Be it known that I, MAX HUTH, a subject of the German Emperor, residing at Charlottenburg, near Berlin, Germany, (post-office address Teglerweg 11,) have invented certain new and useful Improvements in Wire Electrodes for Electrolytic Purposes, of which the following is a specification, illustrated in the accompanying drawings.

The particularly novel features of my invention are more specifically set forth in the annexed claims.

In electrolytic processes in which it is desirable to arrange the electrodes at small distances from each other on account of either poor conductivity of the electrolyte, or on account of the highly diluted electrolyte or on account of the low temperature, or also in cases in which it is desirable to use the highest possible specific current load for the smallest possible weight unit of the electrode on account of the high price of the electrode material (for instance, platinum or the like), it is of advantage to use wire electrodes.

Up to the present wire electrodes have been constructed in such manner that wire was wound on a frame of insulating material, or that the electrode wire was drawn through frames and that electrode frames of different polarity were arranged in alternating order and held together as electrolytic units by means of members, clamping screws or the like. If now such wire electrodes are disposed at very small distances from each other, the danger exists that two wires of the same polarity or two electrode wires of opposite polarity come in contact with each other on account of undue expansion of one or the other wires, and in such cases uneven distribution of current or a short-circuit may occur.

It is the object of the present invention to remove these defects. Accordingly the wire electrodes are arranged so that the individual electrode wires, which are connected to a common conductor of the current supply, hang freely from this conductor and are weighted at their lower ends in order to put the individual wires under mechanical tension. It is of advantage to provide each individual wire with an independent weight which may be shaped either spherical or cylindrical and which may serve at the same time as a spacing element at the lower ends of the wires. It is not necessary in all cases that each wire has an independent weight, but also several wires may have a common weight. In this case it is desirable to form the weight elements so that the necessary distance of the individual wires at their lower ends is maintained under any circumstances. This may be obtained for instance by providing the weights common to several wires, with grooves into which the free wire ends fit.

In the accompanying drawings Figures 1 to 8 show diagrammatically a number of forms in which my invention may be reduced to practice.

Fig. 1 represents the simplest form according to which the individual electrode wires $a-a$ are connected at their upper ends to the common conductor $b$. To the lower end of each wire, a glass ball $c$ is fused. The glass may of course be substituted by any other suitable insulating material of substantial weight. The diameter of balls $c$ corresponds to the desired spacing between the electrodes.

Figure 2:
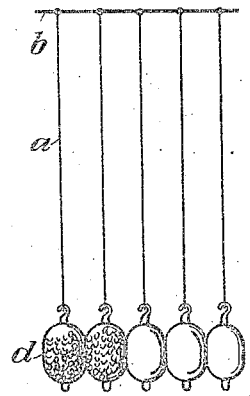

Fig. 2 shows a modification in which as weights, hollow bodies $d$ of glass or similar material are used which are filled with shot or other suitable material. By using weights of this construction a particularly good and uniform tension of the electrode wires can be obtained even if the wires are comparatively heavy.

Figure 3:
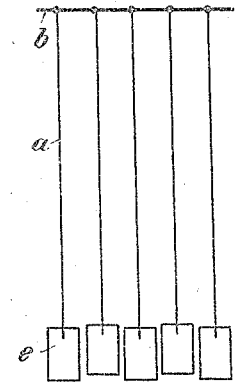

In the modification according to Fig. 3 short capillary tubes are used as weights $e$ attached to the free wire ends by fusing.

Figure 4:
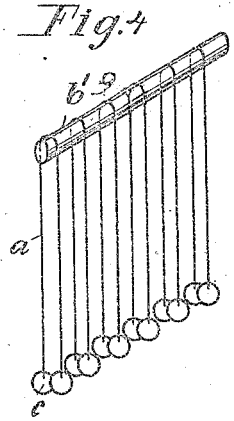
Figure 6:
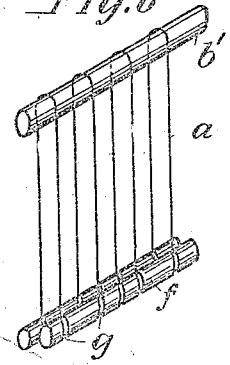

In case soldering of the upper electrode ends to the common current conductor should be avoided, the individual wires may be hung over the common conductor, or a few wires may be lapped around the current conductor in the manner shown in Figs. 4 and 6. In the modification according to Fig. 4, again balls $c$ are used for weights similar to those shown in Fig. 1 and in Fig. 6 cylindrical weights $f$ common to several wires are used. In order to maintain the desired space between the electrodes, the cylindrical weights $f$ are provided with grooves $g$ for receiving the lower ends of the electrode wires $a$. Where such double electrodes as shown in Figs. 4 and 6 are employed, their common supply conductor $b^1$ should be arranged so that a pair of electrode wires of one pole alternates with a pair of wires of the other pole so that a uniform distribution of current over the entire wire surface is obtained.

Figure 5:
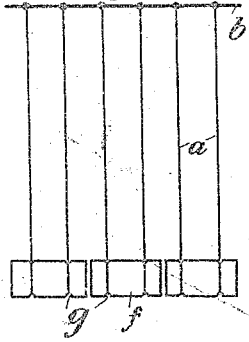

Fig. 5 shows the use of cylindrical weights $f$ provided with grooves $g$ for electrode wires $a$ soldered to their common supply conductor $b$.

Figure 7:
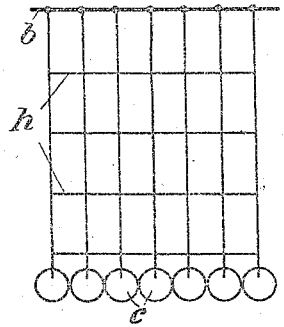
Figure 8:
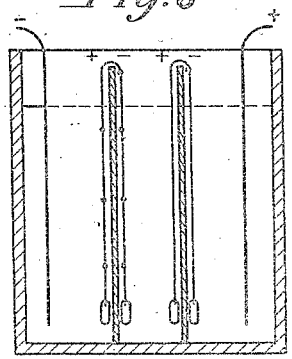

In order to insure uniform distribution of current over the entire available wire electrode area, the individual vertical wires may be connected by thin cross wires $b$ which do not affect the individual mechanical tension of the wires. This form is shown in Fig. 7. Such electrodes held under tension by weights of suitable form are also particularly adapted to serve as double pole electrodes by providing a weight at each end of the wire $n$ and by hanging the latter over an insulating wall $w$ which stands upright in the electrolyte. In this case the cathode may also be made of non-precious metal. This modification is shown in Fig. 8 in longitudinal vertical section.

Electrodes made of such wire elements as described hereinbefore may be used in various ways for electrolysis. The electrodes may be, for instance, only immersed into the electrolyte far enough that the common connection to the current supply and a short piece of the individual wires remain outside of the electrolyte, or the entire electrode containing the individual wires may be submerged in the electrolyte and the connection between the conductor and the individual wires in that case is protected from chemical reaction by a suitable coat of paint or other similar protective means. If the electrode is not entirely submerged the connection between the wires and the current conductor may be made of metals which do not resist the chemical action of the electrolyte and it is then only necessary to protect these connections against splashes from the electrolyte. Owing to the always present mechanical tension of the individual electrode wires and the uniform spacing of the wires due to the weights, the electrode wires may be arranged very close to each other. By this expedient the specific current load is distributed over the entire area of the wires as uniformly as possible and besides the specific current load can be increased to such an extent that the disintegration products which are visible to the eye (for instance hydrogen at the cathode wires rises and concentrated solutions at the anode wires) sink, respectively, in the form of cylinders surrounding the individual wires. These disintegration products constitute such a large volume relatively to the total volume of the electrolyte that, by the continuous upward movement of the gases at the cathode, a thorough mixing of the electrolyte between the electrodes, takes place without employing outside mixing devices.

I claim:—

1. In a wire electrode in combination, a plurality of wires suitably supported to freely hang downward, spacers attached to the free ends of said wires, the weight of said spacers sufficing to keep the wires straight and means for conducting current to said wires.

2. In a wire electrode in combination, a plurality of wires suitably supported to freely hang downward, said wires being divided into single groups, a spacer of sufficient weight to keep the wires straight being fastened to the ends of the wires of each group and means for conducting current to said groups.

3. In a wire electrode in combination, a plurality of wires suitably supported to freely hang downward, said wires being divided into single groups, a spacer of sufficient weight to keep the wires straight being fastened to the ends of the wires of each group, grooves on said spacer adapted to receive the lower portions of the wires, and means for conducting current to said groups.

4. In a wire electrode in combination, a plurality of wires, means for supporting each wire in the middle to permit its ends to freely hang down from the support at opposite sides, a spacer of sufficient weight to keep the wires straight being attached to each end of each wire and means to supply current to said wires.

MAX HUTH.